United States Patent [19]
Shiah et al.

[11] Patent Number: 6,020,576
[45] Date of Patent: Feb. 1, 2000

[54] TEMPERATURE AND WINDSHIELD CRACK DETECTOR

[75] Inventors: Kyi-Shin Shiah, Portland, Oreg.;
Timothy J. Bomya, Westland, Mich.

[73] Assignee: Lear Automotive Dear Born, Inc., Southfield, Mich.

[21] Appl. No.: 08/947,970

[22] Filed: Oct. 9, 1997

[51] Int. Cl.[7] ........................................ H05B 1/02
[52] U.S. Cl. ........................ 219/501; 219/481; 219/203; 219/506; 219/505; 307/117; 361/78; 361/87
[58] Field of Search ..................... 219/203, 202, 219/497, 481, 505, 506, 501; 323/235, 236; 307/117; 361/78, 86, 87

[56] References Cited

U.S. PATENT DOCUMENTS 2,659,237  11/1953  Wood .
3,421,380  1/1969  Mansour .

(List continued on next page.)

FOREIGN PATENT DOCUMENTS

| 822 178 | 11/1951 | Germany . |
|---|---|---|
| 3807087 A1 | 9/1989 | Germany . |
| 39 23 688 A1 | 1/1991 | Germany . |
| 43 13 363 A1 | 11/1993 | Germany . |
| 43 37 760 A1 | 5/1994 | Germany . |
| 56-22150 | 2/1981 | Japan . |
| 5-86761 | 4/1993 | Japan . |
| WO 96/33891 | 10/1996 | WIPO . |
| WO 96/33892 | 10/1996 | WIPO . |
| WO 96/33893 | 10/1996 | WIPO . |

OTHER PUBLICATIONS

Machine Design, Mechanisms for Intermittent Motion, "Part 4", Mar. 1952, Otto Lichtwitz, pp. 147–155.
A paper from the Third Conference on Mechanisms, "Designing for Intermittent Motion with Modified Starwheels", Karl E. Kist, pp. 16–20.
"Mechanisms for Engineering Design" "Motion, Circular, Intermittent", Chapter 3, S.B. Tuttle, John Wiley Co., pp. 33–51.
Machine Design, "Modifying Starwheel Mechanisms", Vandeman and Wood, Apr. 1953, pp. 255–261.
"Kinematics of Intermittent Mechanism III—The Spherical Geneva Wheel", Product Engineering, Oct. 1949, S. Rappaport, pp. 137–139.
Machine Design, "Mechanical Systems", Jun. 1992, pp. 130, 132, 168.
"Mechanisms and Dynamics of Machinery", Hamilton H. Mabie and Fred W. Ocvirk, John Wiley & Sons, 1957.
A paper from the International Congress & Exposition, SAE Technical Paper Series 960390, "Liftgate Multiplexed Node", Feb., 1996, H. Winston Maue, pp. 73–76.
"Panasert Microelectronics Assembly System", Panasonic Catalog Doc. No. TI–701–1–0196, Manufacturing Equipment Division, Matsushita Electric Industrial Co., Ltd., Dec., 1995, p. 15.
"Thermal Clad Thermal Management Substarte", Bergquist Company.

(List continued on next page.)

Primary Examiner—Mark Paschall
Attorney, Agent, or Firm—MacMillan, Sobanski & Todd, LLC

[57] ABSTRACT

An apparatus and method for temperature sensing and for detecting cracks or breakage of a windshield. A resistance element is connected to the windshield and a resistance monitoring circuit is connected to the resistance element for monitoring an electrical property of the resistance element. A physical integrity monitoring device can be connected to the resistance monitoring circuit for determining the physical integrity of the windshield based upon the monitored electrical property of the resistance element. Also, a temperature calculator can be used to determine a temperature based upon the monitored electrical property associated with the resistance element and upon a relationship between resistance and temperature that has been stored in a memory device.

24 Claims, 5 Drawing Sheets

U.S. PATENT DOCUMENTS

| | | |
|---|---|---|
| 3,442,146 | 5/1969 | Simpson . |
| 3,443,442 | 5/1969 | Schweihs . |
| 3,443,455 | 5/1969 | Zugel . |
| 3,574,882 | 4/1971 | Petry . |
| 3,665,772 | 5/1972 | Beard et al. . |
| 3,688,332 | 9/1972 | Bellware . |
| 3,689,817 | 9/1972 | Elliott . |
| 3,694,723 | 9/1972 | Schneider et al. . |
| 3,803,627 | 4/1974 | Schuscheng . |
| 3,917,330 | 11/1975 | Quantz . |
| 3,927,436 | 12/1975 | Inoue et al. . |
| 4,009,952 | 3/1977 | Badalich et al. . |
| 4,158,159 | 6/1979 | Orris et al. . |
| 4,173,055 | 11/1979 | Izumi et al. . |
| 4,183,114 | 1/1980 | Eden . |
| 4,259,624 | 3/1981 | Seibicke . |
| 4,271,381 | 6/1981 | Munz et al. . |
| 4,309,646 | 1/1982 | Liedtke et al. . |
| 4,336,482 | 6/1982 | Goertler et al. . |
| 4,352,299 | 10/1982 | Riggs et al. . |
| 4,422,522 | 12/1983 | Slavin et al. . |
| 4,434,678 | 3/1984 | Maus . |
| 4,492,904 | 1/1985 | Graham . |
| 4,553,656 | 11/1985 | Lense . |
| 4,573,723 | 3/1986 | Morita et al. . |
| 4,639,065 | 1/1987 | Kohler et al. . |
| 4,660,698 | 4/1987 | Miura . |
| 4,664,217 | 5/1987 | Welch et al. . |
| 4,674,781 | 6/1987 | Reece et al. . |
| 4,702,117 | 10/1987 | Tsutsumi et al. . |
| 4,730,097 | 3/1988 | Campbell ............................... 219/203 |
| 4,733,147 | 3/1988 | Muller et al. . |
| 4,810,563 | 3/1989 | DeGree et al. . |
| 4,878,398 | 11/1989 | Heinrich . |
| 4,885,512 | 12/1989 | Gille et al. . |
| 4,893,039 | 1/1990 | Isii . |
| 4,918,272 | 4/1990 | Nishikawa . |
| 4,967,056 | 10/1990 | Iwasa ..................................... 219/203 |
| 5,007,131 | 4/1991 | Chevalier et al. . |
| 5,023,530 | 6/1991 | Ohashi et al. . |
| 5,045,741 | 9/1991 | Dvorsky . |
| 5,063,317 | 11/1991 | Bruhn . |
| 5,072,098 | 12/1991 | Matthews et al. ....................... 219/501 |
| 5,130,518 | 7/1992 | Merle ..................................... 219/497 |
| 5,169,465 | 12/1992 | Riley . |
| 5,182,957 | 2/1993 | Bohmer et al. . |
| 5,218,255 | 6/1993 | Horiguchi . |
| 5,222,775 | 6/1993 | Kato . |
| 5,228,239 | 7/1993 | Heo . |
| 5,251,114 | 10/1993 | Cantin et al. . |
| 5,274,875 | 1/1994 | Chou . |
| 5,291,109 | 3/1994 | Peter . |
| 5,333,351 | 8/1994 | Sato . |
| 5,355,061 | 10/1994 | Forhan . |
| 5,355,286 | 10/1994 | Flint . |
| 5,519,258 | 5/1996 | Stroven et al. . |
| 5,694,812 | 12/1997 | Maue et al. . |

OTHER PUBLICATIONS

Machine Design, "Potentiometer Takes the Heat", Edited by Martha K. Raymond, Dec. 1996, p. 54.

PCIM, "Metal–Backed Boards Improve Thermal Performance of Power Semis", Sep., 1989, PCIM Staff, Herb Fick, Al Pshaenich, Dave Hollander, and Scott Lindbolm, Reprinted from the Sep., 1989 issue of Power Conversion & Intelligent Motion.

Electronics Engineers' Handbook, Second Edition, McGraw–Hill Inc., "Discrete Circuit Components", 1982, p. 7–80.

"Goodheart–Wilcox Automotive Encyclopedia", William K. Toboldt, Larry Johnson, Steven W. Olive, 1989, pp. 723–727.

"Automotive Handbook", Bosch 3rd Edition, 1993, pp. 694–697.

"Kinematic Analysis of Mecanisms", 1959, J.E. Shigley, pp. 228–231.

"Genevamation Indexing Drives", Jan. 12, 1995 Catalog No. 693, Geneva Mechanisms Corporation.

"Saab 900 Owners Workshop Manual", Haynes Publishing Group, 1979 through 1985, pp. 172–174, 237.

Machine Design, "Basics of Design Engineering", Jun. 1992, Article "Mechanical Systems".

A paper from the Third Conference on Mechanisms, "A Survey of Intermittent–Motion", F.J.Bogardus, 1956, pp. 8–15.

Machine Design, Mechanisms for Intermittent Motion, Dec. 1951, Otto Lichtwitz, pp. 134–148.

"Mechanisms for Providing Intermittent Rotary Motion", Product Engineering, Aug. 1949, pp. 116–117.

Machine Design, Mechanisms for Intermittent Motion, "Part 2", Jan. 1952, Otto Lichwitz, pp. 127–141.

Machine Design, Mechanisms for Intermittent Motion, "Part 3", Feb. 1952, Otto Lichtwitz, pp. 146–155.

"Your Thermal Via is a Dead End Without Bergquist Bond Ply", Bergquist Company.

U T Automotive, a United Technologies Company, "Advanced Electronic Packaging".

TEMPERATURE AND WINDSHIELD CRACK DETECTOR

BACKGROUND OF THE INVENTION

1. Technical Field

This invention relates generally to automotive windshields, and in particular to a temperature sensing and windshield crack detection device.

2. Discussion

The proper functioning of a vehicle's heated backlight of a rear windshield is an important aspect for the daily operation of a vehicle. This proper functioning of the heated backlight is made even more critical during the colder months of the year, when fogging and ice formation on the rear windshield is more likely to occur.

Malfunctions of the heated backlight can occur due to several reasons. A proper and expedient identification of the root cause for the malfunction is very useful for diagnosis of the malfunction. However, previous rear windshield configurations do not allow for early detection of cracks which would be severe enough to render the heated backlight inoperational. Moreover, past configurations do not provide for temperature monitoring of the vehicle's outside environment that would enable the vehicle to perform such functions as automatically turning on the heated backlight whenever the temperature falls below a predetermined set point.

SUMMARY OF THE INVENTION

In accordance with the teachings of the present invention, the present invention is an apparatus and method for temperature sensing and/or for crack detection of a windshield. A resistance element is connected to the windshield. A resistance monitoring circuit which is connected to the resistance element monitors an electrical property of the resistance element. In one embodiment, a physical integrity monitoring device can be connected to the resistance monitoring circuit for determining the physical integrity of the windshield based upon the monitored electrical property of the resistance element. In a second embodiment, a temperature calculator can be used to determine a temperature based upon the monitored electrical property associated with the resistance element and upon a relationship between resistance and temperature that has been stored in a memory device.

Additional advantages and features of the present invention will become apparent from the following description and appended claims, taken in conjunction with the accompanying drawings.

DETAILED DESCRIPTION OF THE PREFERRED EMBODIMENT

Figure 1A:
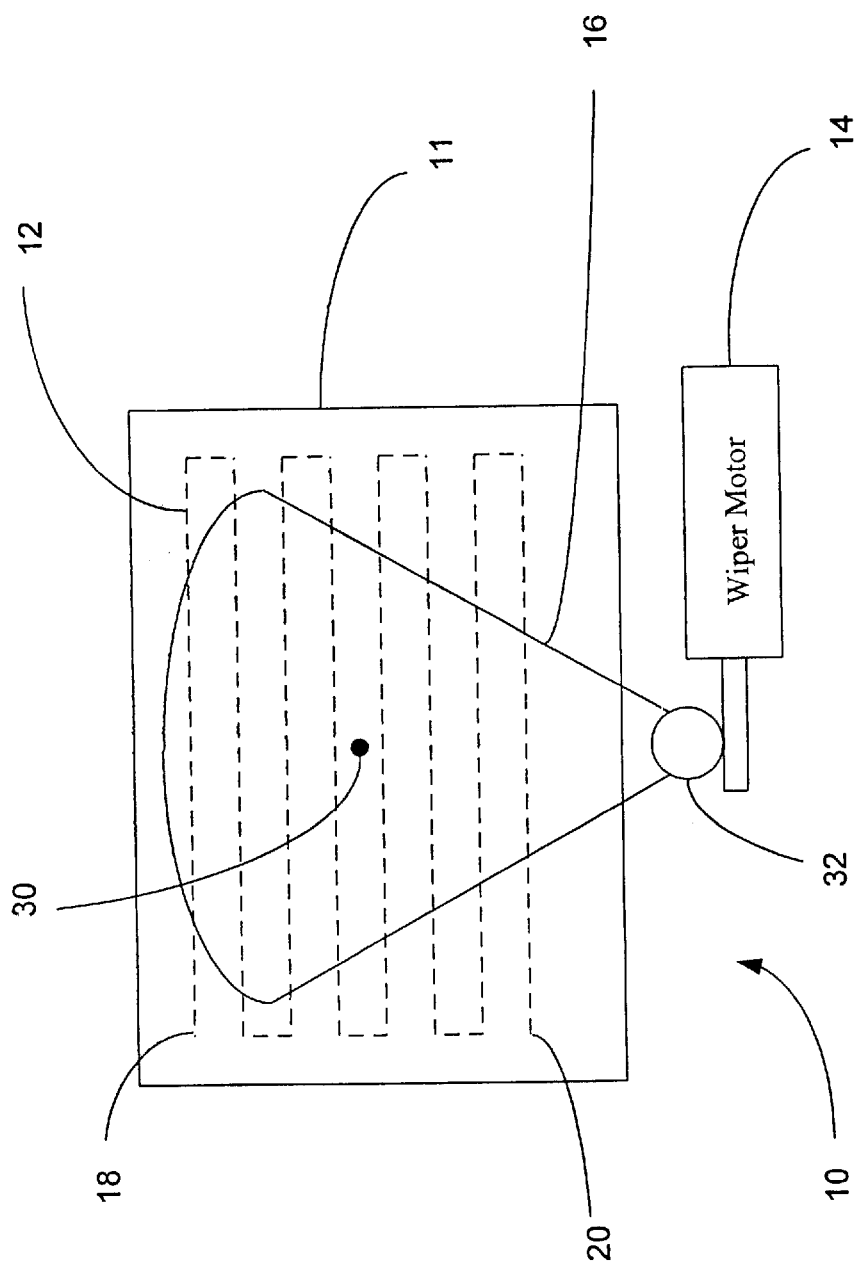
FIG. 1*a* is a frontal view of an exemplary configuration for a rear windshield with a heated backlight.

FIG. 1*a* shows an exemplary rear windshield 10 of a vehicle which has a heated backlight 12 in order to heat the glass 11 of the rear windshield 10. A rear wiper motor 14 cleans the rear windshield 10 by powering a wiper blade so as to produce wiper fan pattern 16. The heated backlight 12 includes a first heated backlight node 18 and a second heated backlight node 20 in order to monitor the voltage drop between these two points that are located on the heated backlight 12.

While the preferred embodiment of the present invention depicts the nodes (18 and 20) being located at the extreme points of the heated backlight 12, it is to be understood, however, that the present invention is not limited to such a placement of the nodes. Other locations are contemplated within the scope of the present invention that enable the voltage drop of the heated backlight 12 to be ascertained.

A thermocouple 30 is provided during installation of the rear windshield 10 onto a vehicle in order to calibrate the resistance of the heated backlight 12 with temperature measurements. The temperature measurements are used to correlate the resistance of the heated backlight 12 to the temperatures measured by thermocouple 30. A microcontroller (not shown) stores the temperature values from thermocouple 30. The present invention allows for temperature sensing by comparing the resistance of the heated backlight 12 with the temperature values acquired during rear windshield factory installation. The micro-controller is preferably stored in the gear housing 32 of the rear wiper motor 14. The preferred embodiment includes using a micro-controller that is a part of a rear node assembly that controls other aspects of the rear portion of a vehicle.

Once the calibration has been completed, thermocouple 30 is removed from the rear windshield 10. Also with respect to thermocouple 30, locations other than the center of the windshield can be used so as to be able to sense the ambient temperature.

Additionally, the present invention includes using such other devices besides a thermocouple for calibration purposes. For example, an infrared thermometer can be used which can be remotely mounted and focused upon the windshield in order to perform temperature measurements.

Figure 1B:
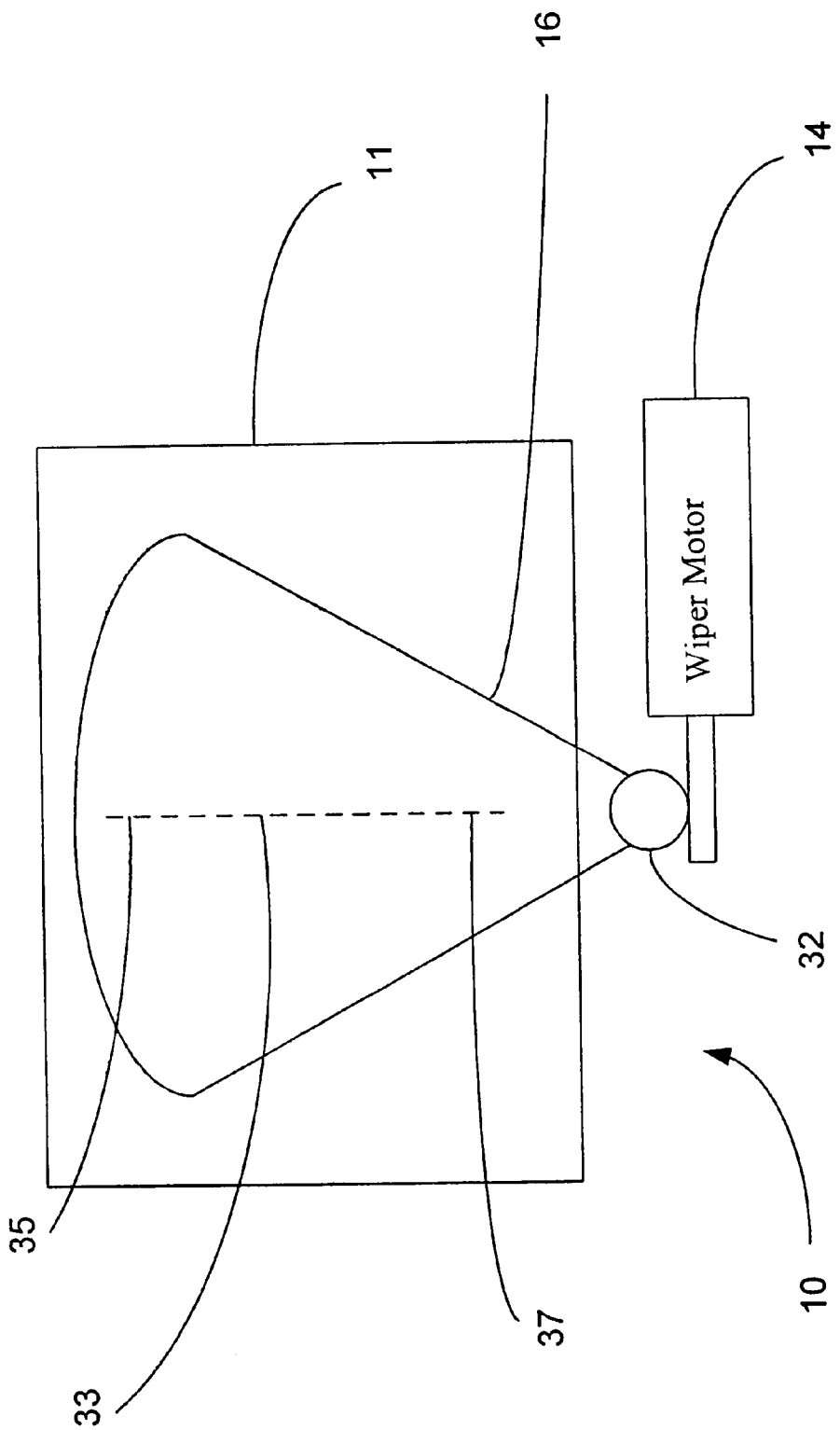
FIG. 1*b* is a frontal view of an exemplary configuration for a rear windshield with an antenna.

FIG. 1*b* shows another embodiment wherein an exemplary rear windshield 10 of a vehicle has an antenna 33 that receives radio waves. Antenna 33 includes a first node 35 and a second node 37 in order to monitor the voltage drop between these two points that are located on the heated backlight 12. This voltage drop can be used to determine whether the rear windshield 10 has a crack or has been shattered (such as, in a car theft situation).

Figure 2:
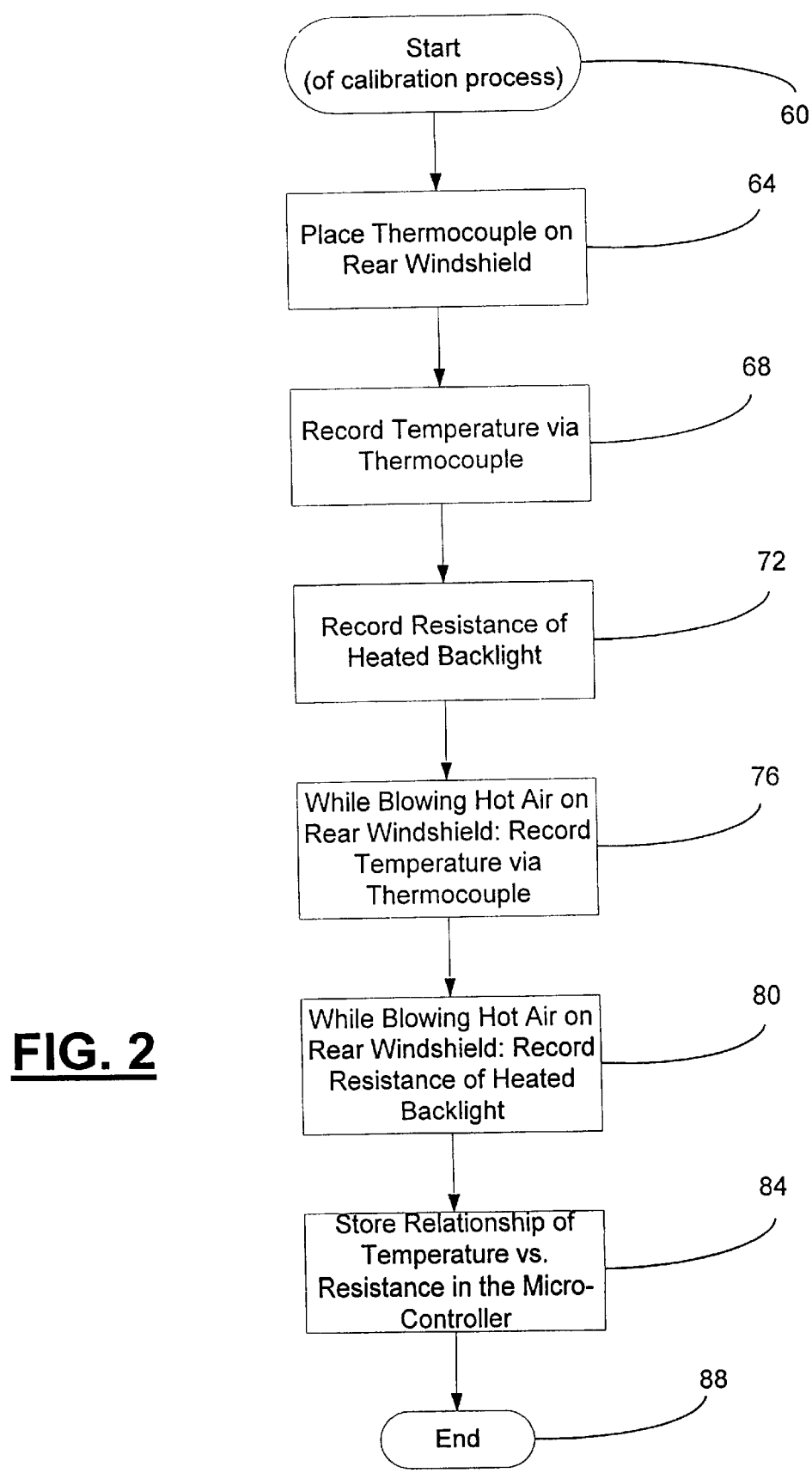
FIG. 2 is a flowchart showing the temperature calibration steps of the present invention.

FIG. 2 depicts the processing steps for calibrating the present invention in order to do temperature sensing. Start indication block 60 indicates that block 64 is to be performed. Block 64 indicates that a thermocouple is to be placed on the rear windshield at some point during the installation of the rear windshield upon the vehicle. At block 68, the temperature is recorded via the thermocouple. Block 72 records the resistance of the heated backlight while the rear windshield is at the temperature that was recorded at block 68.

While blowing hot air upon the rear windshield, block 76 records the temperature of the rear windshield via the thermocouple. Substantially concurrently, block 80 records the resistance of the heated backlight.

These two points of temperature versus resistance determine the relationship between temperature and resistance. The preferred embodiment uses a linear relationship of resistance versus temperature and stores the slope and the y-intercept of the linear relationship in a micro-controller (at block 84) that is to be placed in the gear housing of the rear wiper motor.

While the present invention preferably uses a linear relationship to express the temperature versus resistance relationship, it is to be understood that the present invention is not limited to only a linear relationship, but includes other mathematical relationships that indicate the temperature versus resistance relationship. For example, the present invention contemplates acquiring additional temperatures versus resistance points in order to use a parabolic relationship.

Figure 3:
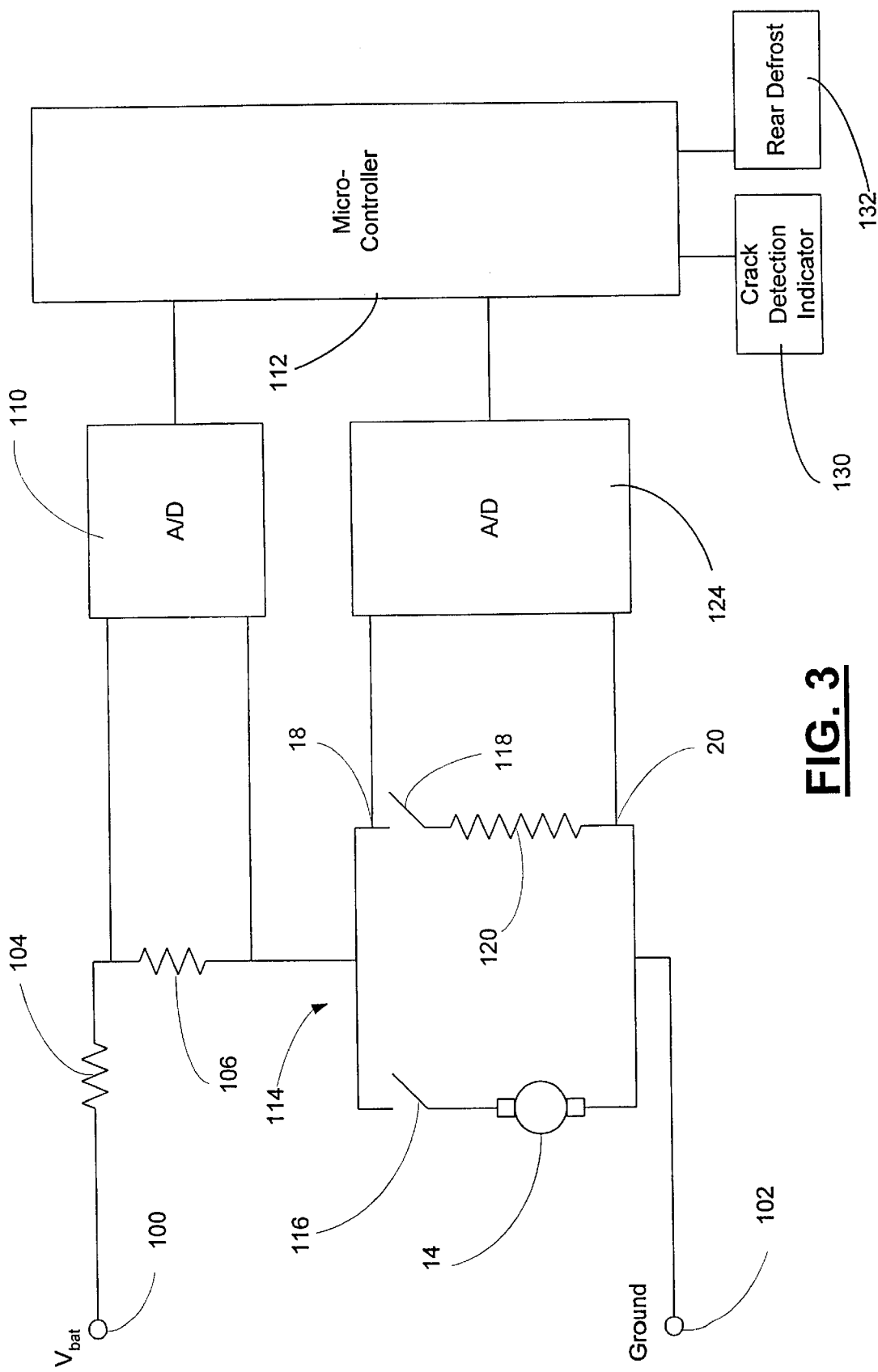
FIG. 3 is a schematic block diagram of the electronic components of the preferred embodiment of the present invention.

FIG. 3 shows the preferred electronic circuitry for performing the temperature sensing and rear windshield crack detection for the present invention. The voltage of the vehicle's battery is indicated at reference numeral 100 while ground is represented at reference numeral 102. The vehicle's wire harness connects the battery to the circuitry of the present invention. The resistance of the wire harness is shown at reference numeral 104. The voltage drop of current shunt 106 is monitored by a first A/D converter 110. This voltage drop is provided to the micro-controller 112.

A parallel circuit shown generally at 114 uses a first switch 116 and a second switch 118 in order to control the current flow to the rear wiper motor 14 and to the heated backlight (which is shown as heated backlight resistance 120). When first switch 116 is open and second switch 118 is closed, a second A/D converter 124 is used to monitor the voltage drop of the heated backlight resistance 120 at first heated backlight node 18 and heated backlight node 20. This voltage drop is then sent from the second A/D converter 124 to micro-controller 112.

If micro-controller 112 determines that a crack is present on the rear windshield based upon the information from the AND converters (110 and 124), then micro-controller 112 sends a signal to crack detection indicator 130 so as to provide indication that a crack is present. Crack detection indicator 130 preferably provides this indication to a person while diagnostics are being performed upon the vehicle (such as when a vehicle is brought to a garage to repair the vehicle's heated backlight). Moreover, crack detection indicator 130 also may include being connected to a vehicle's anti-theft device and activating it when indicator 130 detects a crack or breakage of the windshield.

Figure 4:
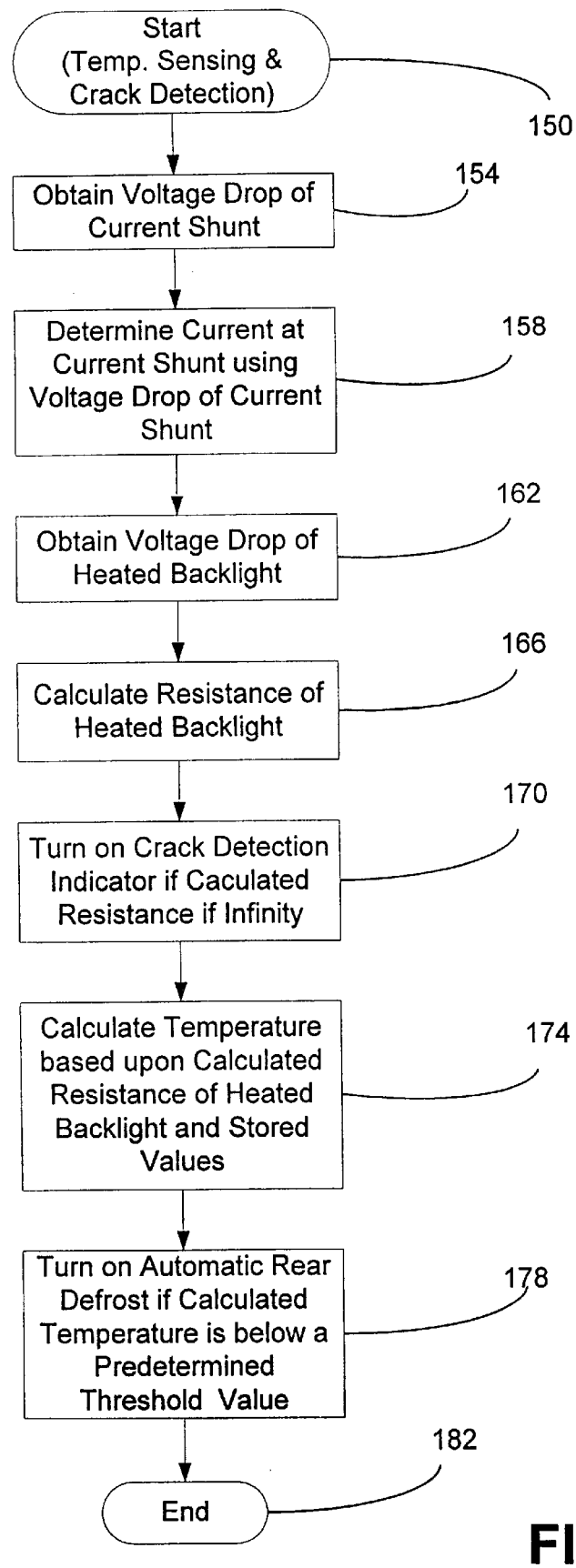
FIG. 4 is a flowchart showing the operational steps for detecting cracks and temperature sensing.

Moreover, if the micro-controller 112 determines that the temperature as calculated by the voltage drop values from the first A/D converter 110 and the second A/D converter 124 are below a predetermined threshold value, then micro-controller 112 automatically turns on rear defrost 132. FIG. 4 depicts the processing steps preferably performed internally by micro-controller 112 in order to perform the crack detection and temperature sensing functions of the present invention.

FIG. 4 depicts the steps for temperature sensing and crack detection which are performed while first switch 116 is open and second switch 118 is closed. Moreover, temperature sensing is preferably performed only when the heated backlight is not activated. With reference to FIG. 4, start indication block 150 indicates that block 154 is to be performed. At block 154, the micro-controller obtains the voltage drop of the current shunt and at block 158 determines the current at the current shunt using the following equation:

$$I_{CURRENT\ SHUNT} = (V_{CURRENT\ SHUNT})/(R_{CURRENT\ SHUNT})$$

Since the resistance of current shunt had been previously stored in the micro-controller (such as during installation of the rear windshield in the factory) and the voltage drop of the current shunt had been furnished by the first A/D converter, the current level at the current shunt can be determined by the micro-controller at block 158.

Block 162 obtains the voltage drop of the heated backlight via the second A/D converter. Block 166 calculates the resistance of the heated backlight using the following equation:

$$R_{HEATED\ BACKLIGHT} = (Voltage_{HEATED\ BACKLIGHT})/(I_{CURRENT\ SHUNT})$$

Since the voltage drop of the heated backlight had been obtained at block 162 and the current of the current shunt had been determined at block 158, the resistance of the heated backlight can be calculated at block 166. If the calculated resistance of the heated backlight corresponds to that of an open circuit (i.e., infinity or a lack of continuity), the crack detection indicator is activated at block 170.

Block 174 calculates the present temperature based upon the calculated resistance of block 166 and upon the micro-controller stored values that determine the relationship between temperature and resistance. Block 174 preferably uses the following equation:

$$Temperature_{PRESENT} = (stored\ slope\ value) \times (R_{HEATED\ BACKLIGHT}) + (stored\ y\text{-intercept})$$

The micro-controller can perform a number of operations based upon the calculated temperature of block 174. One such operation includes the operation of block 178 wherein an automatic rear defrost is activated if the calculated temperature is below a predetermined threshold value. An optical device can be used in conjunction with the present invention in order to detect that ice is on the window. For example, the defrost device would be activated if: the temperature as determined by the present invention is below a certain threshold (such as below 32 degrees Fahrenheit); and the optical device determines that the visibility of the windshield is below a certain threshold (such as less than 75% visibility). Termination block 182 indicates that processing ends.

The embodiments which have been set forth were for the purpose of illustration and were not intended to limit the invention and will be appreciated by those skilled in the art that various changes and modifications may be made to the embodiments discussed in this specification without departing from the spirit and scope of the invention as defined by the appended claims.

The invention claimed is:

1. An apparatus for analyzing physical integrity of a windshield, comprising:
   a resistance element connected to said windshield, said resistance element being an antenna which is substantially coupled to the windshield;
   a resistance monitoring circuit connected to said resistance element for monitoring an electrical property of said resistance element; and
   a physical integrity monitoring device connected to said resistance monitoring circuit for determining the physical integrity of the windshield based upon said monitored electrical property of said resistance element.

2. The apparatus of claim 1 wherein said resistance element is a heated backlight element for heating the windshield.

3. The apparatus of claim 1 wherein said resistance monitoring circuit measures voltage drop between two points located on said resistance element.

4. The apparatus of claim 1 wherein said electrical property being selected from the group consisting of a voltage property, a current property, a resistance property, and combinations thereof.

5. The apparatus of claim 1 wherein said physical integrity monitoring device includes a micro-controller connected to said resistance monitoring circuit for determining whether said electrical property is indicative of an open circuit condition for said resistance element.

6. The apparatus of claim 5 further comprising:

a current shunt circuit connected to said resistance monitoring circuit and to said micro-controller, said micro-controller determining the current associated with said current shunt circuit based upon the voltage drop across said current shunt circuit.

7. The apparatus of claim 6 wherein said micro-controller determines the resistance associated with said resistance element based upon the voltage drop across said resistance element and upon the current associated with said current shunt circuit, said micro-controller being included in a rear node of a vehicle.

8. The apparatus of claim 7 further comprising:

a memory connected to said micro-controller for storing a relationship between temperature and resistance of said resistance element, said micro-controller determining a temperature based upon said determined resistance associated with said resistance element and upon said relationship.

9. A temperature sensing device, comprising:

a resistance element connected to a windshield;

a resistance monitoring circuit connected to said resistance element for monitoring an electrical property of said resistance element;

a memory for storing a relationship between temperature and resistance of said resistance element;

a temperature calculator connected to said memory and to said resistance monitoring circuit for determining a temperature based upon said monitored electrical property associated with said resistance element and upon said stored relationship.

10. The apparatus of claim 9 wherein said resistance element is a heated backlight element for heating the windshield.

11. The apparatus of claim 9 wherein said resistance element is an antenna which is substantially coupled to the windshield.

12. The apparatus of claim 9 wherein said resistance monitoring circuit measures a voltage drop between two points located on said resistance element.

13. The apparatus of claim 9 wherein said electrical property being selected from the group consisting of a voltage property, a current property, a resistance property, and combinations thereof.

14. The apparatus of claim 9 wherein said temperature calculator is a micro-controller, said apparatus further comprising:

a current shunt circuit connected to said resistance monitoring circuit and to said micro-controller, said micro-controller determining the current associated with said current shunt circuit based upon the voltage drop across said current shunt circuit.

15. The apparatus of claim 14 wherein said micro-controller determines the resistance associated with said resistance element based upon the voltage drop across said resistance element and upon the current associated with said current shunt circuit, said micro-controller determining a temperature based upon said determined resistance associated with said resistance element and upon said stored relationship, said micro-controller being included in a rear node of a vehicle.

16. The apparatus of claim 9 further comprising:

a physical integrity monitoring device connected to said resistance monitoring circuit for determining the physical integrity of the windshield based upon said monitored electrical property of said resistance element.

17. The apparatus of claim 16 wherein said physical integrity monitoring device includes a micro-controller connected to said resistance monitoring circuit for determining whether said electrical property is indicative of an open circuit condition for said resistance element.

18. A method for analyzing physical characteristics of a windshield, said windshield being connected to a resistance element, comprising:

monitoring an electrical property of said resistance element;

determining the state of a physical characteristic of the windshield based upon said monitored electrical property of said resistance element;

storing a relationship between temperature and resistance of said resistance element;

determining a temperature based upon said monitored electrical property associated with said resistance element and upon said relationship.

19. The method of claim 18 further comprising the step of:

determining the physical integrity of the windshield based upon said monitored electrical property of said resistance element.

20. The method of claim 19 further comprising the step of:

measuring the voltage between two points located on said resistance element, said resistance element being a heated backlight element.

21. The method of claim 19 wherein said electrical property being selected from the group consisting of a voltage property, a current property, a resistance property, and combinations thereof.

22. The method of claim 19 further comprising the step of:

determining whether said electrical property is indicative of an open circuit condition for said resistance element.

23. The method of claim 18 further comprising the steps of:

determining an amount of current associated with a current shunt circuit based upon the voltage drop across said current shunt circuit, said current shunt circuit being connected to said resistance element;

determining the resistance associated with said resistance element based upon the voltage drop across said resistance element and upon the current associated with said current shunt circuit; and determining a temperature based upon said determined resistance associated with said resistance element and upon said stored relationship.

24. The method of claim 18 further comprising the step of:

determining the physical integrity of the windshield based upon said monitored electrical property of said resistance element.

* * * * *